US012746867B2

(12) United States Patent
Poulakis et al.

(10) Patent No.: US 12,746,867 B2
(45) Date of Patent: *Sep. 29, 2026

(54) FLOOR MAT ATTACHMENT

(71) Applicant: Gottlieb Binder GmbH & Co. KG, Holzgerlingen (DE)

(72) Inventors: Konstantinos Poulakis, Hildrizhausen (DE); Lars Heepe, Tuebingen (DE)

(73) Assignee: Gottlieb Binder GmbH & Co. KG, Holzgerlingen (DE)

( * ) Notice: Subject to any disclaimer, the term of this patent is extended or adjusted under 35 U.S.C. 154(b) by 372 days.

This patent is subject to a terminal disclaimer.

(21) Appl. No.: 18/365,986

(22) Filed: Aug. 5, 2023

(65) Prior Publication Data

US 2024/0042911 A1 Feb. 8, 2024

(30) Foreign Application Priority Data

Aug. 8, 2022 (DE) ..................... 10 2022 208 235.4

(51) Int. Cl.
*B60N 3/04* (2006.01)

(52) U.S. Cl.
CPC ............. *B60N 3/044* (2013.01); *B60N 3/042* (2013.01); *B60N 3/046* (2013.01); *B60N 3/048* (2013.01)

(58) Field of Classification Search
CPC ........ B60N 3/042; B60N 3/044; B60N 3/046; B60N 3/048; H05K 1/09; H05K 3/24
See application file for complete search history.

(56) References Cited

U.S. PATENT DOCUMENTS

| | | | |
|---|---|---|---|
| 5,215,348 | A | 6/1993 | Wen-Hwang |
| 5,384,939 | A | 1/1995 | Weber |
| 6,412,142 | B1 | 7/2002 | Iverson |
| 10,173,570 | B2 | 1/2019 | Dresen-Rausch et al. |
| 2015/0140261 | A1 | 5/2015 | Papp |
| 2017/0072823 | A1 | 3/2017 | Assil |

FOREIGN PATENT DOCUMENTS

| | | | |
|---|---|---|---|
| CN | 204674427 | U | 9/2015 |
| CN | 105283295 | A | 1/2016 |
| CN | 107264369 | A | 10/2017 |
| DE | 82 21 629 | U1 | 12/1982 |
| DE | 89 11 331 | U1 | 11/1989 |
| DE | 10 2007 004 146 | A1 | 7/2008 |
| DE | 10 2010 042 284 | A1 | 4/2012 |

(Continued)

*Primary Examiner* — Lawrence D Ferguson
(74) *Attorney, Agent, or Firm* — Orbit IP, LLP; Marc G. Martino

(57) ABSTRACT

A foot mat arrangement with a floor unit and a foot mat can be fastened to the floor unit. The foot mat can be fastened to the floor unit by means of a hook-and-loop connection. The hook-and-loop connection has a first hook-and-loop element, which is fastened to the floor unit by material bonding, in particular, by a welded connection. The first hook-and-loop element can have a loop pile fabric. The first hook-and-loop element is preferably fastened to an attachment. The attachment and/or a carpet can be fastened to a floor element of the floor unit, in particular, by a material bond. A vehicle may have such a foot mat arrangement and a method for producing the floor unit of such a foot mat arrangement is disclosed.

10 Claims, 3 Drawing Sheets

B-B

(56) References Cited

FOREIGN PATENT DOCUMENTS

| | | | | |
|---|---|---|---|---|
| DE | 10 2012 007 433 | A1 | | 10/2013 |
| DE | 20 2014 101 483 | U1 | | 4/2014 |
| EP | 3 925 770 | A2 | | 12/2021 |
| JP | H05-85245 | A | | 4/1993 |
| JP | H05-278511 | A | | 10/1993 |
| JP | 2009-254488 | A | | 11/2009 |
| JP | 2010207530 | A | * | 9/2010 |
| KR | 20-0204204 | Y1 | | 11/2000 |

* cited by examiner

FLOOR MAT ATTACHMENT

CROSS-REFERENCE TO RELATED APPLICATIONS

This application claims priority to German Patent Application No. 10 2022 208 235.4, filed Aug. 8, 2022, the entire contents of which are hereby incorporated in full by this reference.

DESCRIPTION

Field of the Invention

The invention relates to a foot (i.e., floor) mat arrangement for a vehicle, in particular, for a passenger vehicle, preferably for the foot space of the driver of a passenger vehicle. The foot mat arrangement has a floor unit with a first hook-and-loop element fastened to the upper side of the floor unit. The foot mat arrangement furthermore has a foot mat with a second hook-and-loop element fastened to the underside of the foot mat. The hook-and-loop elements correspond to one another, i.e., they are matched to one another in such a way that the foot mat can be fastened to the floor unit by a hook-and-loop connection that can be formed between the first hook-and-loop element and the second hook-and-loop element.

The invention further relates to a vehicle having such a foot mat arrangement and a method for producing a floor unit of such a foot mat arrangement.

Background of the Invention

It is known to fasten a foot mat in a vehicle in the manner described above.

The generic DE 82 21 629 U1 discloses a frame-shaped edging which is welded with carpet material and/or can be connected to the carpet material by a hook-and-loop connection. A heel plate is inserted into the frame-shaped edging and is connected to the carpet material by a hook-and-loop strip. However, secure fastening of the heel plate on the carpet material is achieved only in conjunction with the frame-shaped edging, which produces an incomplete impression when the heel plate is removed.

US 2017/0072823 A1, U.S. Pat. No. 5,215,348 A, KR 20-0204204 Y1 and DE 89 11 331 U1 disclose foot mats that can be inserted into a foot space, wherein the foot mats have parts that are replaceable via hook-and-loop connectors. The replaceable parts are for ornamental purposes or are used as replaceable wear parts.

Finally, various surface coverings are disclosed in EP 3 925 770 A2 that are fixed via hook-and-loop connections.

In order to be able to clean a foot mat easily, it should be able to be removed quickly and easily from the vehicle. In contrast, in the state inserted into the vehicle, it should be securely fixed, in particular, in the driver's foot space in order to prevent the pedals from being adversely affected by a slipped foot mat. Furthermore, the foot space should also have an attractive and uniform visual appearance when the foot mat is removed, and the fastening of the foot mat in the foot space should be realized in a structurally simple manner and at low cost. Despite a wide range of known options for connecting foot mats, no solution has yet been found that meets all the above criteria.

SUMMARY OF THE INVENTION

Object of the Invention

It is therefore the object of the invention to provide a foot mat arrangement which enables the fastening of a foot mat in a simple, visually pleasing and reliable manner. It is further an object of the invention to provide a vehicle with such a foot mat arrangement and a method for producing a floor unit for such a foot mat arrangement.

Description of the Invention

This object is achieved according to the invention by a foot mat arrangement, a vehicle and a method according to claims.

The object is achieved in a surprisingly simple manner by a foot mat arrangement described above, in which the first hook-and-loop element is attached to the floor unit with a material bond.

A materially bonded connection is understood, in particular, to mean a thermal joining connection and/or an adhesive connection. The materially bonded connection enables a permanently reliable connection of the first hook-and-loop element, and thus also of the foot mat, to the floor unit.

The indications "above," "below," "on," "under," etc. used here relate to the fully installed state of the foot mat arrangement, in particular, in a vehicle.

The second hook-and-loop element can also be materially bonded to the foot mat.

Preferably, the first hook-and-loop element is fastened to the floor unit by a welded connection.

In a particularly preferred embodiment of the invention, both the floor unit and the first hook-and-loop element are made of plastic at least In the region of the welded connection. This makes it possible to form a welded connection produced by high-frequency welding, in particular, by ultrasonic welding. The first hook-and-loop element and the floor unit can be made entirely of plastic.

The floor unit can have a floor element and an attachment, wherein the attachment is fastened to the floor element, in particular, by a material bond. The attachment can be fastened to the floor element by a welded connection. The first hook-and-loop element is materially bonded to the attachment, preferably by a welded connection. Preferably, both the attachment and the floor element are made of plastic at least in the region of the welded connection. The use of an attachment enables the material bonding of the first hook-and-loop element "offline," i.e., upstream of the vehicle assembly. The attachment with the first hook-and-loop element already attached thereto can be provided to the vehicle production process as a prefabricated vehicle part.

The floor unit can have a carpet which is visible from above at least when the foot mat is removed. The floor unit can be formed completely in the shape of the carpet. The first hook-and-loop element can be fastened directly to the carpet.

The carpet can be recessed in the region of the first hook-and-loop element. However, as previously mentioned, the first hook-and-loop element is preferably fastened directly to the carpet. The carpet can be fastened, for example, to a floor element of the floor unit.

In a further embodiment of the foot mat arrangement, the attachment is fastened to the floor element and the carpet is recessed in the region of the attachment. However, the carpet is preferably not recessed; rather, the attachment is fastened to the carpet. The fastening of the attachment to the carpet can be accomplished by material bonding, in particular, by a welded connection.

In order to obtain as optically attractive a foot space as possible even when the foot mat is removed, the coloring, height and/or structure of the carpet can match the coloring, height and/or structure of the first hook-and-loop element. A uniform height of the carpet and of the first hook-and-loop element is understood here to mean that the upwardly pointing tips, or free ends, of the carpet and of the first hook-and-loop element substantially form a plane. The height of the first hook-and-loop element thus takes into account the attachment that may be present.

In the foot mat arrangement:

a) the first hook-and-loop element can have hook-shaped elements and/or mushroom-shaped elements and the second hook-and-loop element can have corresponding hook-shaped elements, mushroom-shaped elements, and/or loop pile fabric; and/or b) the second hook-and-loop element can have hook-shaped elements and/or mushroom-shaped elements and the first hook-and-loop element can have corresponding hook-shaped elements, mushroom-shaped elements and/or loop pile fabric.

Preferably, the first hook-and-loop element has loop pile fabric and the second hook-and-loop element has corresponding hook-shaped and/or mushroom-shaped elements. As a result, when the foot mat is removed the floor unit has an appealing visual appearance, in particular, when the floor unit has carpet.

The loop pile fabric can be woven, weft-knitted and/or warp-knitted. The loop pile fabric may be mounted on a substrate of the first hook-and-loop element or second hook-and-loop element.

The first hook-and-loop element and/or the second hook-and-loop element can comprise polyester, polyamide, polyolefin, recycled polymer, biopolymer, and/or a thermoplastic elastomer.

In order to facilitate the recycling of the foot mat arrangement, the loop pile fabric may be made of a type-pure polymer (in other words a single type of polymer). Particularly preferably, the first hook-and-loop element and/or the second hook-and-loop element are made of a type-pure polymer.

The object according to the invention is further achieved by a vehicle having a foot mat as described herein. The vehicle is preferably designed in the form of a motor vehicle, in particular, in the form of a passenger car. The foot mat arrangement is preferably provided in the foot space of the driver.

The object according to the invention is further achieved by a method for producing a floor unit described herein for a foot mat arrangement, wherein the first hook-and-loop element is attached to the floor unit by material bonding.

The first hook-and-loop element is preferably attached to the floor unit by welding, in particular, high-frequency welding, preferably ultrasonic welding. As a result, the connection between the first hook-and-loop element and the floor unit can be formed both reliably and cost-effectively.

In the manufacture of the floor unit, the first hook-and-loop element is preferably attached to the attachment before the attachment is attached to the floor element or carpet. This makes it possible to form the materially bonded connection of the first hook-and-loop element before assembling the vehicle parts to form a vehicle.

Further advantages of the invention can be found in the description and the schematic drawing. The aforementioned features and those which are to be explained below can each be used, in accordance with the invention, individually by themselves or in multiples, in any combinations. The embodiments shown and described are not to be understood as an exhaustive list, but, rather, have an exemplary character for the description of the invention.

DETAILED DESCRIPTION OF THE INVENTION AND DRAWINGS

DETAILED DESCRIPTION OF EMBODIMENTS OF THE INVENTION

Figure 1:
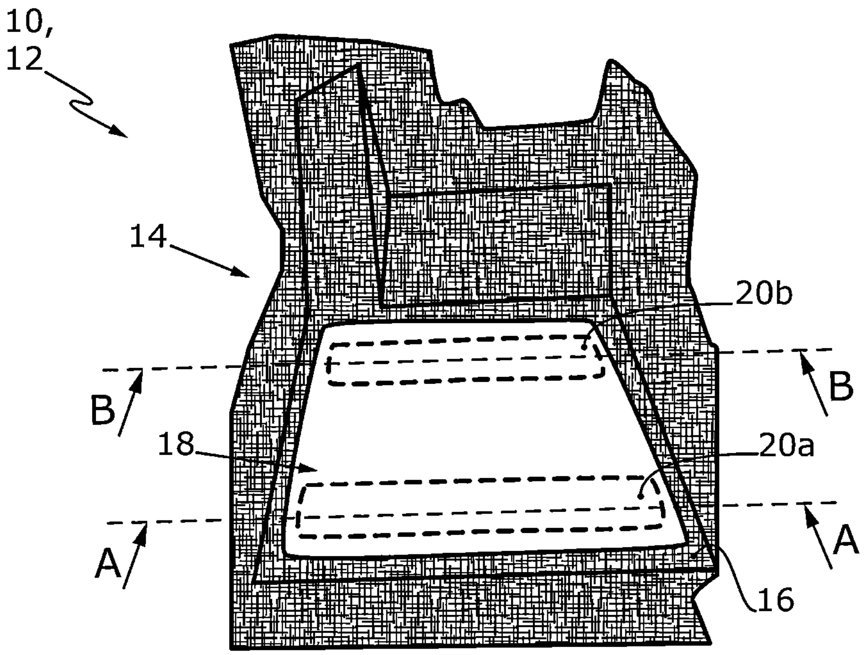
FIG. 1 shows a perspective view of a part of a vehicle with a foot mat arrangement, wherein the foot mat arrangement has a floor unit and a foot mat fixed on the floor unit.

FIG. 1 shows a vehicle 10, of which only a foot space 12 is shown, here in the region of the driver of the vehicle 10. The vehicle 10 has a foot mat arrangement 14 having a floor unit 16 and a foot mat 18 (shown filled with white in FIG. 1). The foot mat 18 is fastened to the floor unit 16 by hook-and-loop connections 20*a*,20*b* (framed in dashed lines in FIG. 1). The foot mat 18 should be easily removable from the foot space 12 for cleaning. At the same time, however, the hook-and-loop connections 20 *a,b* must securely fix the foot mat 18 when it is in place, in order to prevent accidental displacement of the foot mat 18 against a pedal (not shown) of the vehicle 10 and thus jamming when the pedal is actuated.

Figure 2:
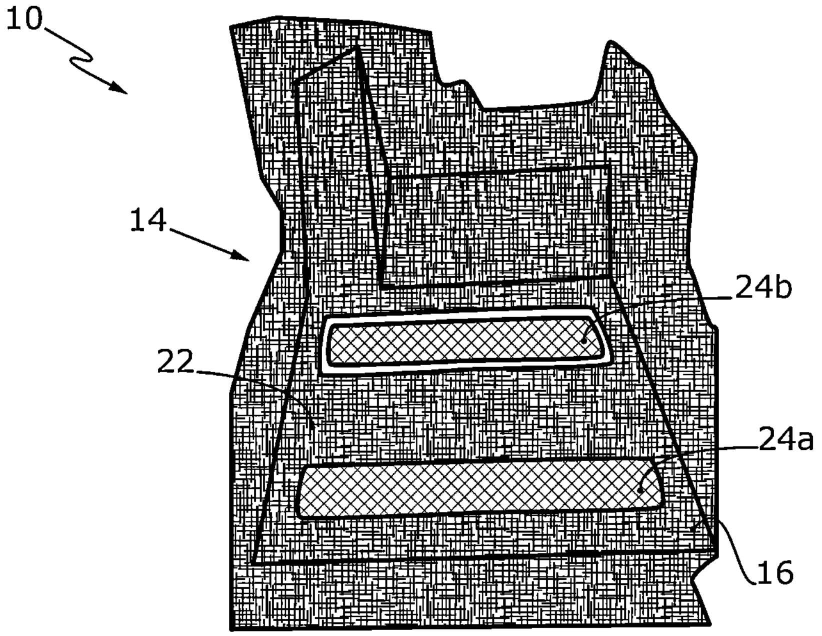
FIG. 2 shows a perspective view of the vehicle with the foot mat arrangement according to FIG. 1 when the foot mat is removed.

FIG. 2 shows the vehicle 10 with the foot mat arrangement 14 according to FIG. 1, but with the foot mat 18 removed. The floor unit 16 has a carpet 22. It can be seen from FIG. 2 that the floor unit 16 has first hook-and-loop elements 24*a*, 24*b* (shown with checkered filling in FIG. 2). In particular, the fastening of the first hook-and-loop elements 24*a, b* is shown in different variants in the FIGS. 3 to 6, described in the following.

Figure 3:
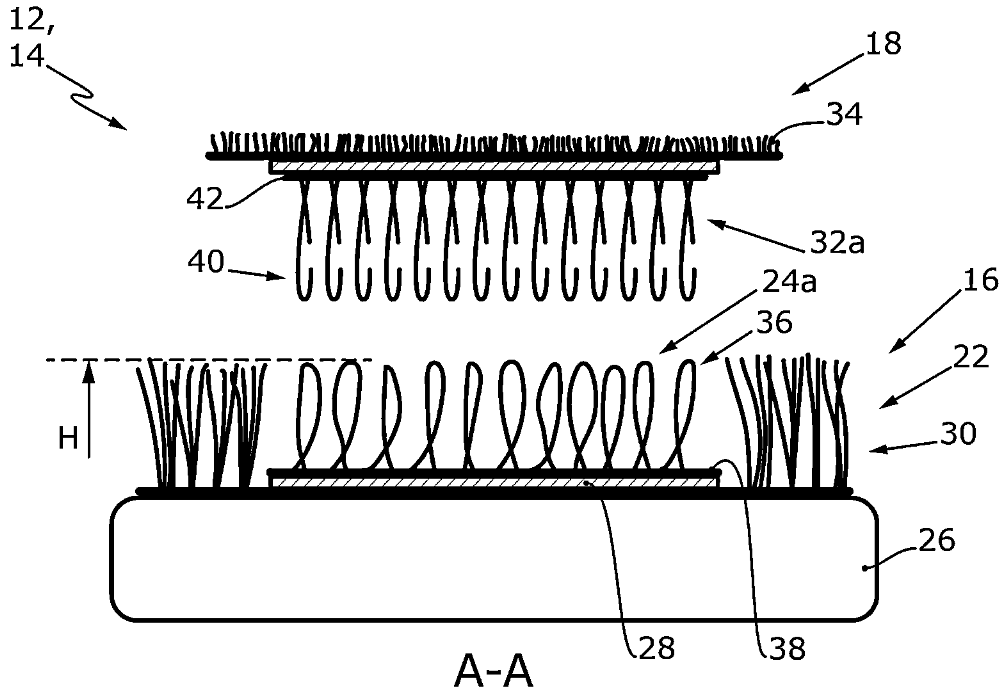
FIG. 3 shows a sectional view of the foot mat arrangement along the line A-A from FIG. 1.

FIG. 3 shows the foot mat arrangement 14 with the floor unit 16 and the foot mat 18 in section A-A according to FIG. 1. The floor unit 16 has a floor element 26, in particular, made of plastic. The carpet 22 is fastened, in particular, glued, to the floor element 26. The first hook-and-loop element 24*a* is materially bonded to the carpet 22, in particular, by a welded connection 28. The welded connection 28 was produced by high-frequency welding. The welded connection 28 enables a reliable fixing of the first hook-and-loop element 24*a* in the foot space 12. To form a particularly reliable welded connection 28, carpet fibers 30 can be shortened in the area of the welded connection 28 or—as shown in FIG. 3—removed.

A second hook-and-loop element 32*a* corresponding to the first hook-and-loop element 24*a* is attached to the foot mat 18. Preferably, the second hook-and-loop element 32*a* is welded to the foot mat 18, as shown in FIG. 3. The foot mat 18 can have foot mat fibers 34 on its upper side.

The first hook-and-loop element 24*a* has a loop pile fabric 36. The loop pile fabric 36 can be mounted on a substrate 38 of the first hook-and-loop element 24*a*. The loop pile fabric 36 and/or the substrate 38 of the first hook-and-loop element 24*a* can be made of plastic. Preferably, polyester, polyamide, polyolefin, recycled polymer, biopolymer and/or a thermoplastic elastomer is used here. In order to enable type-sorted recycling of the first hook-and-loop element 24*a*, the loop pile fabric 36 is preferably made of the same plastic as the substrate 38 of the first hook-and-loop element 24*a*. Particularly preferably, the carpet 22 and/or the floor element 26 are also made of the same plastic as the first hook-and-loop element 24*a*.

The second hook-and-loop element 32*a* has hook-shaped elements 40. The hook-shaped elements 40 can be arranged on a substrate 42 of the second hook-and-loop element 32*a*. The hook-shaped elements 40 and/or the substrate 42 of the second hook-and-loop element 32*a* can be formed from a plastic. Preferably, polyester, polyamide, polyolefin, recycled polymer, biopolymer and/or a thermoplastic elastomer is used here. In order to enable type-sorted recycling of the second hook-and-loop element 32*a*, the hook-shaped elements 40 are preferably made of the same plastic as the substrate 42 of the second hook-and-loop element 32*a*. Further preferably, the second hook-and-loop element 32*a* is formed from the same plastic as the first hook-and-loop element 24*a*.

In principle, the combination of loop pile fabric 36 and hook-shaped elements 40 could also be arranged in transposed fashion, so that the first hook-and-loop element 24*a* has hook-shaped elements and the second hook-and-loop element 32*a* has loop pile fabric. However, the case shown in FIG. 3 is preferred in order to achieve a more uniform appearance of the foot space 12 when the foot mat 18 is removed. The loop pile fabric 36 can in this case correspond in its shape, color and/or height H to the shape, color and/or height H of the carpet 22.

Figure 4:
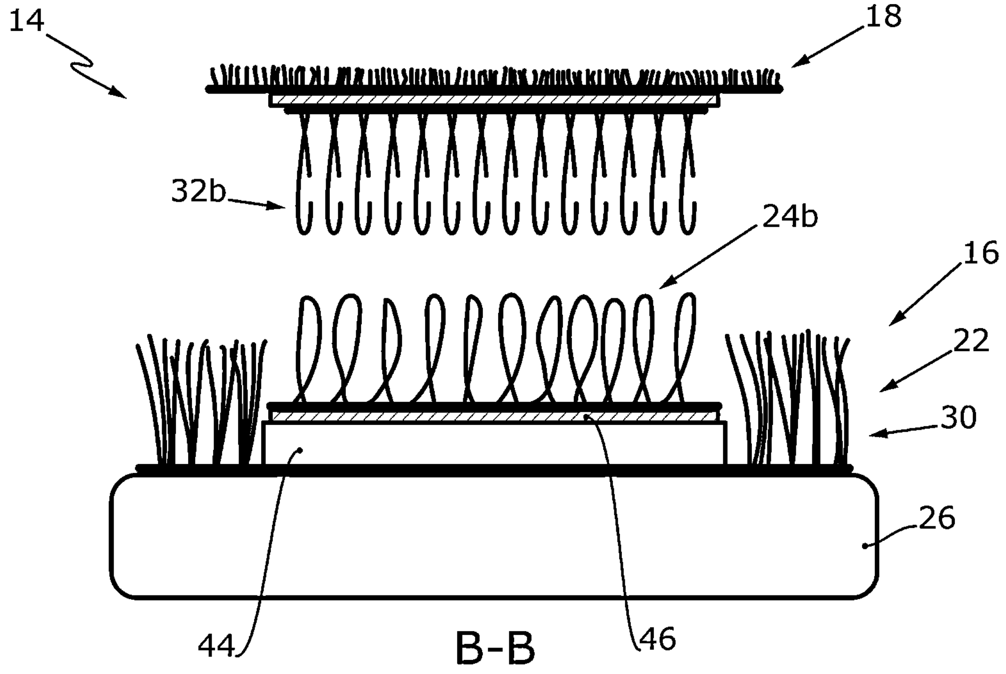
FIG. 4 shows a sectional view of the foot mat arrangement along the line B-B from FIG. 1.

FIG. 4 shows the foot mat arrangement 14 with the floor unit 16 and the foot mat 18 in the section B-B according to FIG. 1. It can be seen from FIG. 4 that the first hook-and-loop element 24*b* is indirectly connected to the floor element 26. The carpet 22 is fastened to the floor element 26, in particular, welded and/or glued. An attachment 44 of the floor unit 16 is fastened to the carpet 22, here welded and/or glued. To form a particularly reliable connection between the carpet 22 and the attachment 44, carpet fibers 30 can be shortened in the region of the connection or can be removed, as shown in FIG. 4.

The attachment 44 is preferably made of plastic. The first hook-and-loop element 24*b* is attached to the attachment 44 with a material bond, in particular, by a welded connection 46. The first hook-and-loop element 24*b* can be connected to a corresponding second hook-and-loop element 32*b*.

The first hook-and-loop element 24*b* projects beyond the carpet 22. This can facilitate setting up the hook-and-loop connection 20*a, b* (see FIG. 1) between the foot mat 18 and the floor unit 16 via the hook-and-loop elements 32*b*, 24*b*.

Figure 5:
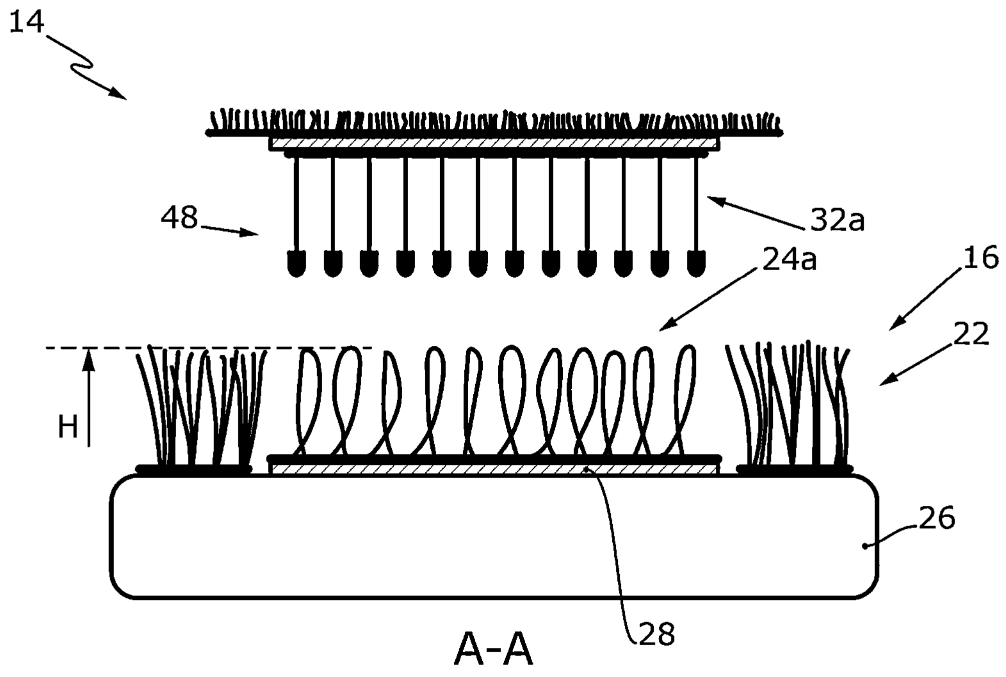
FIG. 5 shows a sectional view of an alternative embodiment of a foot mat arrangement along the line A-A from FIG. 1.

In FIG. 5, a variant of a foot mat arrangement 14 is shown in the view according to FIG. 3. A first hook-and-loop element 24*a* is attached directly to a floor element 26 of the floor unit 16 with a material bond, here by a welded connection 28. A carpet 22 is recessed in the region of the first hook-and-loop element 24*a*. The height H of the first hook-and-loop element 24*a* corresponds to the height H of the carpet 22.

A second hook-and-loop element 32*a* has mushroom-shaped elements 48. The material of the mushroom-shaped elements 48 can correspond to the material of the hook-shaped elements 40 described in FIG. 3.

Figure 6:
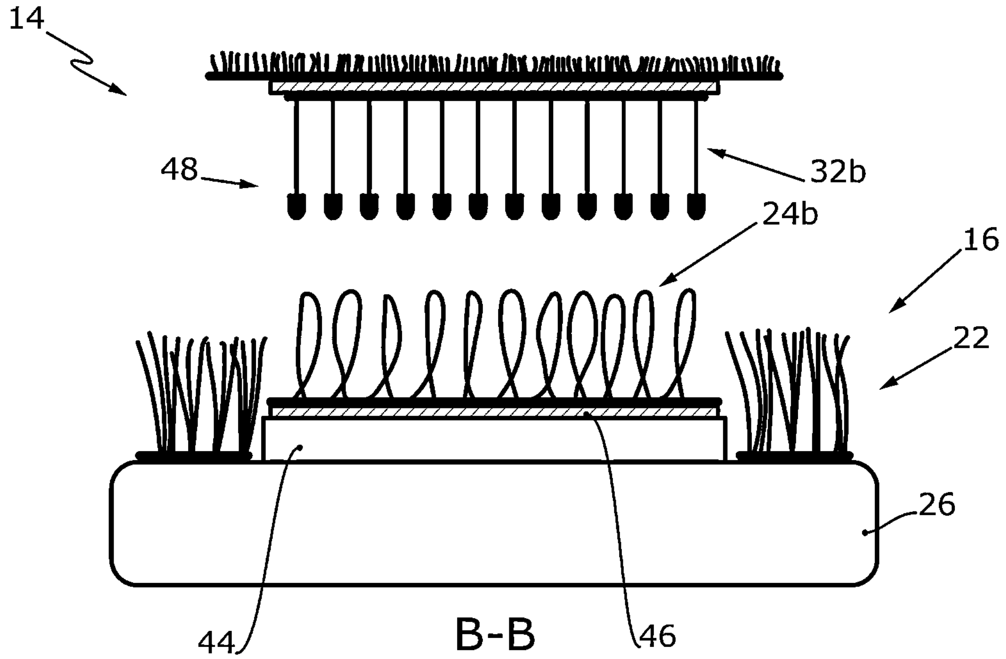
FIG. 6 shows a sectional view of an alternative embodiment of a foot mat arrangement along the line B-B from FIG. 1.

FIG. 6 shows a variant of a foot mat arrangement 14 in the view according to FIG. 4. A first hook-and-loop element 24*b* is attached to an attachment 44 with a material bond, here by a welded connection 46. The carpet 22 is recessed in the region of the attachment 44. The attachment 44 is attached directly to a floor element 26 of the floor unit 16. A second hook-and-loop element 32*b* has mushroom-shaped elements 48 analogous to the variant described in FIG. 5.

Taking an overview of all figures of the drawings, the invention relates in summary to a foot mat arrangement 14 with a floor unit 16 and a foot mat 18 that can be fastened to the floor unit 16. The foot mat 18 can be fastened to the floor unit 16 by means of a hook-and-loop connection 20*a, b*. The hook-and-loop connection 20*a, b* has a first hook-and-loop element 24*a, b* which is fastened to the floor unit 16 with a material bond, in particular, by a welded connection 28, 46. The first hook-and-loop element 24*a, b* can have a loop pile fabric 36. The first hook-and-loop element 24*a, b* is preferably fastened to an attachment 44. The attachment 44 and/or a carpet 22 can be fastened on a floor element 26 of the floor unit 16, in particular, with a material bond. The invention further relates to a vehicle 10 having such a foot mat arrangement 14 and to a method for producing the floor unit 16 of such a foot mat arrangement 14.

LIST OF REFERENCE SIGNS

10 vehicle
12 foot space of the vehicle
14 foot mat arrangement
16 floor unit
18 foot mat
20*a, b* hook-and-loop connection between floor unit 16 and foot mat 18
22 carpet
24*a, b* first hook-and-loop element on the floor unit 16
26 floor element
28 welded connection between floor element 26 and first hook-and-loop element 24*a*
30 carpet fibers
32*a, b* second hook-and-loop element
34 foot mat fibers
36 loop pile fabric
38 substrate of the first hook-and-loop element 24*a, b*
40 hook-shaped elements
42 substrate of the second hook-and-loop element 32*a, b*
44 attachment
46 welded connection between attachment 44 and first hook-and-loop element 24*b*
48 mushroom-shaped elements
H absolute height of the carpet 22 or of the loop pile fabric 36

What is claimed is:

1. A foot mat arrangement for a vehicle, the foot mat arrangement comprising:
a floor unit comprising:
a first hook-and-loop element attached to a first hook-and-loop substrate on an upper side of the first hook-and-loop substrate;
a carpet substrate having a plurality of carpet fibers extending upwardly attached on an upper side of the carpet substrate;

wherein a lower side of the first hook-and-loop substrate is attached to the upper side of the carpet substrate with a welded connection at an attachment area, wherein the welded connection is a high-frequency welded connection;

a foot mat;

a second hook-and-loop element on the underside of the foot mat;

the second hook-and-loop element corresponding to the first hook-and-loop element wherein the foot mat is configured to be fastened to the floor unit by a hook-and-loop connection between the first hook-and-loop element and the second hook-and-loop element.

2. The foot mat arrangement according to claim 1, wherein a coloring and/or a structure of the carpet substrate having the plurality of carpet fibers corresponds to a coloring and/or a structure of the first hook-and-loop substrate having the first hook-and-loop element.

3. The foot mat arrangement according to claim 1, wherein the first hook-and-loop element has loop pile fabric and the second hook-and-loop element has corresponding hook-shaped and/or mushroom-shaped elements.

4. The foot mat arrangement according to claim 3, wherein the loop pile fabric is woven, weft-knitted and/or warp-knitted.

5. The foot mat arrangement according to claim 1, wherein the first hook-and-loop element and/or the second hook-and-loop element comprises polyester, polyamide, polyolefin, recycled polymer, biopolymer and/or a thermoplastic elastomer.

6. The foot mat arrangement according to claim 1, wherein the first hook-and-loop element and/or the second hook-and-loop element consist of a polymer in a mono-material manner.

7. The foot mat arrangement according to claim 1, wherein the high-frequency welding connection is an ultrasonic welding connection.

8. A foot mat arrangement for a vehicle, the foot mat arrangement comprising:

a floor unit comprising:

a first hook-and-loop element attached to a first hook-and-loop substrate on an upper side of the first hook-and-loop substrate;

a carpet substrate having a plurality of carpet fibers extending upwardly attached on an upper side of the carpet substrate;

a plastic attachment having an upper side and a lower side, wherein the plastic attachment is disposed between the upper side of the carpet substrate and a lower side of the first hook-and-loop substrate at an attachment area;

wherein the lower side of the first hook-and-loop substrate is attached to the upper side of the plastic attachment with a welded connection, wherein the welded connection is a high-frequency welded connection;

a foot mat;

a second hook-and-loop element on the underside of the foot mat;

the second hook-and-loop element corresponding to the first hook-and-loop element wherein the foot mat is configured to be fastened to the floor unit by a hook-and-loop connection between the first hook-and-loop element and the second hook-and-loop element.

9. A foot mat arrangement for a vehicle, the foot mat arrangement comprising:

a floor unit comprising:

a first hook-and-loop element attached to a first hook-and-loop substrate on an upper side of the first hook-and-loop substrate;

a plastic floor element having an upper side;

wherein a lower side of the first hook-and-loop substrate is attached to the upper side of the plastic floor arrangement with a welded connection, wherein the welded connection is a high-frequency welded connection;

a foot mat;

a second hook-and-loop element on the underside of the foot mat;

the second hook-and-loop element corresponding to the first hook-and-loop element wherein the foot mat is configured to be fastened to the floor unit by a hook-and-loop connection between the first hook-and-loop element and the second hook-and-loop element.

10. A foot mat arrangement for a vehicle, the foot mat arrangement comprising:

a floor unit comprising:

a first hook-and-loop element attached to a first hook-and-loop substrate on an upper side of the first hook-and-loop substrate;

a plastic floor element having an upper side;

a plastic attachment having an upper side and a lower side, wherein the plastic attachment is disposed between the upper side of the plastic floor element and a lower side of the first hook-and-loop substrate;

wherein the lower side of the first hook-and-loop substrate is attached to the upper side of the plastic attachment with a welded connection, wherein the welded connection is a high-frequency welded connection;

a foot mat;

a second hook-and-loop element on the underside of the foot mat;

the second hook-and-loop element corresponding to the first hook-and-loop element wherein the foot mat is configured to be fastened to the floor unit by a hook-and-loop connection between the first hook-and-loop element and the second hook-and-loop element.

* * * * *